(12) United States Patent
Julkunen et al.

(10) Patent No.: US 9,323,643 B1
(45) Date of Patent: Apr. 26, 2016

(54) METHOD AND SYSTEM FOR ANALYZING MOBILE APPS

(71) Applicant: GameRefinery Oy, Helsinki (FI)

(72) Inventors: Joel Julkunen, Helsinki (FI); Veli-Pekka Julkunen, Espoo (FI)

(73) Assignee: GameRefinery Oy, Helsinki (FI)

( * ) Notice: Subject to any disclaimer, the term of this patent is extended or adjusted under 35 U.S.C. 154(b) by 0 days.

(21) Appl. No.: 14/797,706

(22) Filed: Jul. 13, 2015

(51) Int. Cl.
*G06F 9/44* (2006.01)
*G06F 11/36* (2006.01)

(52) U.S. Cl.
CPC ........ *G06F 11/3604* (2013.01); *G06F 11/3692* (2013.01)

(58) Field of Classification Search
CPC .......................... G06F 11/3604; G06F 11/3692
USPC ............ 717/124–135; 705/7.11; 714/37, 38.1
See application file for complete search history.

(56) References Cited

U.S. PATENT DOCUMENTS

| | | | |
|---|---|---|---|
| 7,580,853 B2 | 8/2009 | Short | |
| 8,060,393 B2 | 11/2011 | Short | |
| 8,315,897 B2 | 11/2012 | Short | |
| 8,521,575 B2 | 8/2013 | Short | |
| 8,745,617 B1 * | 6/2014 | Stekkelpak | G06F 9/44505 717/173 |
| 8,886,550 B2 | 11/2014 | Short | |
| 2007/0244742 A1 * | 10/2007 | Short | G06Q 10/063 705/7.28 |
| 2008/0209567 A1 * | 8/2008 | Lockhart | G06F 11/3612 726/25 |
| 2009/0037896 A1 * | 2/2009 | Grechanik | G06F 8/65 717/168 |
| 2010/0023381 A1 * | 1/2010 | Short | G06Q 10/063 705/7.31 |
| 2010/0174691 A1 * | 7/2010 | Caldwell | G06F 17/30598 707/696 |
| 2010/0299465 A1 * | 11/2010 | Arndt | G06F 1/3203 710/104 |
| 2012/0053988 A1 * | 3/2012 | Short | G06Q 10/063 705/7.29 |
| 2012/0323630 A1 * | 12/2012 | Short | G06Q 10/063 705/7.29 |
| 2013/0339086 A1 * | 12/2013 | Short | G06Q 10/063 705/7.29 |
| 2014/0143145 A1 * | 5/2014 | Kortina | G06Q 20/401 705/44 |
| 2014/0196158 A1 * | 7/2014 | Buck | G06F 21/31 726/30 |
| 2014/0201714 A1 * | 7/2014 | Vaidyan | G06F 11/3668 717/124 |
| 2014/0289010 A1 | 9/2014 | Short | |

* cited by examiner

*Primary Examiner* — Qing Chen
(74) *Attorney, Agent, or Firm* — Ziegler IP Law Group, LLC

(57) ABSTRACT

A method for analyzing at least one test app is provided. The method comprises collecting feature data related to a plurality of historical apps, extracting features of the plurality of historical apps from the feature data, classifying the features of the plurality of historical apps into a plurality of feature groups, and assigning weights to the features of the plurality of historical apps to generate reference data. The method further comprises collecting feature data related to the at least one test app, extracting features of the at least one test app from the feature data, classifying the features of the at least one test app into the plurality of feature groups, and assigning weights to the features of the at least one test app based upon the reference data.

21 Claims, 8 Drawing Sheets

METHOD AND SYSTEM FOR ANALYZING MOBILE APPS

TECHNICAL FIELD

The present disclosure relates generally to mobile apps; and more specifically, to methods for analyzing mobile apps. Moreover, the present disclosure relates to systems for analyzing mobile apps. Furthermore, the present disclosure also concerns computer program products comprising non-transitory machine-readable data storage media having stored thereon program instructions that, when accessed by a processing device, cause the processing device to execute the aforesaid methods.

BACKGROUND

Mobile game business is expected to exceed game console business. In the year 2015, expected revenue for the mobile game business is $30.3 billion (source: *Newzoo*).

New mobile games can be created with a relatively small amount of work and investments. However, publishing a mobile game requires high marketing investments.

In any business, it is valuable to understand what features should be implemented in a product in order to make it successful. From a perspective of a game developer, it is desirable to understand what type of game should be developed and what features should be implemented in it. From a perspective of a game publisher, it is desirable to understand out of various games offered by developers which games should be published and invested in.

Conventionally, game publishers often select games for publishing based upon an ad hoc decision or intuition.

There exist methods for evaluating, classifying and predicting game trends. Such methods employ clustered pattern recognition to compare games using features sets.

However, before any comparison can be made, it is essential to extract features of the games. Conventionally, the features are extracted manually, where in essence a human operator is playing a game and answering a set of predetermined questions. This makes the whole process of feature extraction tedious and time-consuming. Moreover, manual tasks are bound to involve risks of human errors.

SUMMARY

The present disclosure seeks to provide an improved method for analyzing at least one test app.

The present disclosure also seeks to provide an improved system for analyzing at least one test app.

A further aim of the present disclosure is to at least partially overcome at least some of the problems of the prior art, as discussed above.

In a first aspect, embodiments of the present disclosure provide a method for analyzing at least one test app, the method comprising:
(a) collecting feature data related to a plurality of historical apps;
(b) extracting features of the plurality of historical apps from the feature data collected at the step (a);
(c) classifying the features of the plurality of historical apps into a plurality of feature groups;
(d) assigning weights to the features of the plurality of historical apps to generate reference data;
(e) collecting feature data related to the at least one test app;
(f) extracting features of the at least one test app from the feature data collected at the step (e);
(g) classifying the features of the at least one test app into the plurality of feature groups; and
(h) assigning weights to the features of the at least one test app based upon the reference data generated at the step (d).

In a second aspect, embodiments of the present disclosure provide a system for analyzing at least one test app, the system comprising a data processing arrangement, wherein the data processing arrangement is operable to:
(a) collect feature data related to a plurality of historical apps;
(b) extract features of the plurality of historical apps from the feature data collected at (a);
(c) classify the features of the plurality of historical apps into a plurality of feature groups;
(d) assign weights to the features of the plurality of historical apps to generate reference data;
(e) collect feature data related to the at least one test app;
(f) extract features of the at least one test app from the feature data collected at (e);
(g) classify the features of the at least one test app into the plurality of feature groups; and
(h) assign weights to the features of the at least one test app based upon the reference data generated at (d).

In a third aspect, embodiments of the present disclosure provide a computer program product comprising a non-transitory machine-readable data storage medium having stored thereon program instructions that, when accessed by a processing device, cause the processing device to:
(a) collect feature data related to a plurality of historical apps;
(b) extract features of the plurality of historical apps from the feature data collected at (a);
(c) classify the features of the plurality of historical apps into a plurality of feature groups;
(d) assign weights to the features of the plurality of historical apps to generate reference data;
(e) collect feature data related to the at least one test app;
(f) extract features of the at least one test app from the feature data collected at (e);
(g) classify the features of the at least one test app into the plurality of feature groups; and
(h) assign weights to the features of the at least one test app based upon the reference data generated at (d).

Embodiments of the present disclosure substantially eliminate or at least partially address the aforementioned problems in the prior art, and enable developers to gain an insight into which features should be implemented in apps and how the apps should be modified so as to suit current trends in making apps, and enable publishers to select apps that are commercially viable.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
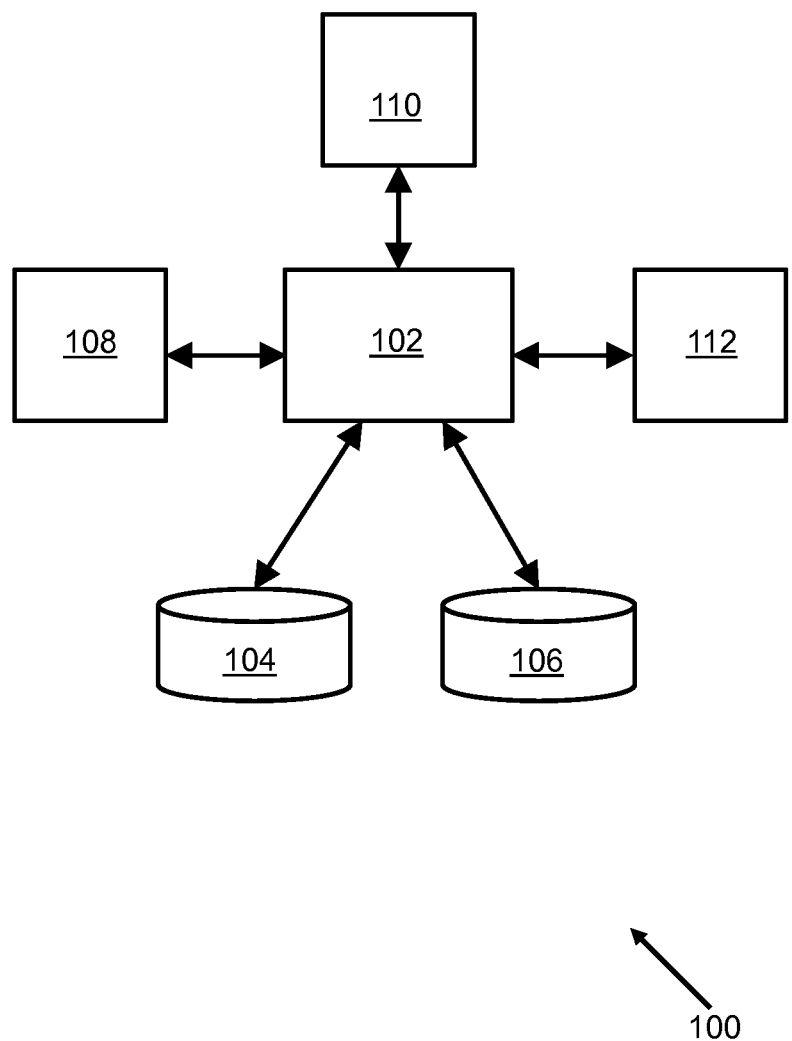
FIG. 1 is an illustration of an example network environment in which a system for analysing at least one test app is implemented pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

GLOSSARY

Brief definitions of terms used throughout the present disclosure are given below.

The term "app" generally refers to application software.

The term "mobile app" generally refers to application software designed for portable computing devices.

The term "mobile game" generally refers to a video game that is played on a portable computing device.

The term "portable computing device" generally refers to a computing device that is portable and is easy to carry. A portable computing device is often handheld. Examples of portable computing devices include, but are not limited to, smart phones, Mobile Internet Devices (MIDs), phablet computers, tablet computers, Ultra-Mobile Personal Computers (UMPCs), Personal Digital Assistants (PDAs), web pads, handheld Personal Computers (PCs) and laptop computers.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the present disclosure provided herein, one of ordinary skill in the art will appreciate a variety of ways in which connection or coupling exists in accordance with the aforementioned definition.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

EMBODIMENTS OF THE PRESENT DISCLOSURE

In a first aspect, embodiments of the present disclosure provide a method for analyzing at least one test app, the method comprising:

(a) collecting feature data related to a plurality of historical apps;
(b) extracting features of the plurality of historical apps from the feature data collected at the step (a);
(c) classifying the features of the plurality of historical apps into a plurality of feature groups;
(d) assigning weights to the features of the plurality of historical apps to generate reference data;
(e) collecting feature data related to the at least one test app;
(f) extracting features of the at least one test app from the feature data collected at the step (e);
(g) classifying the features of the at least one test app into the plurality of feature groups; and
(h) assigning weights to the features of the at least one test app based upon the reference data generated at the step (d).

Optionally, the plurality of historical apps include apps that have been successful within their respective genres during a predefined time period. The predefined time period is either user-defined or system-defined by default. As an example, the predefined time period can be last one week, last two weeks, last one month, last two months, last quarter, last year, and so on.

According to an embodiment of the present disclosure, the collecting at the step (a) and/or the step (e) is performed in an automated manner. Optionally, in this regard, the collecting at the step (a) and/or the step (e) comprises receiving the feature data corresponding to at least one feature of a given app from at least one user device on which the given app has run or is running.

Optionally, the collecting at the step (a) and/or the step (e) is performed by employing a software library that is linked with the given app. Optionally, the software library is linked with the given app during a development phase of the given app. Optionally, in this regard, a developer links the software library with the given app according to a predefined manual. Alternatively, optionally, the software library is linked with the given app using a plug-in architecture.

As a result, the given app makes a function call to the software library when the at least one feature of the given app is invoked. Optionally, a function to which the given app makes the function call then writes information related to the at least one feature, namely the feature data corresponding to the at least one feature, onto a log maintained at the at least one user device.

The log is then sent to a data processing arrangement executing the aforementioned method. Optionally, the log is sent on a periodic basis. Alternatively, optionally, the log is sent in near real time, namely while the given app is running on the at least one user device. This potentially enables the collecting of the feature data to be performed in near real time from actual users of the given app.

In an example where the given app is a mobile game, features that can be logged into the log include at least one of: a count of different screen actors in the mobile game, a time when a given screen actor makes a first appearance at a user interface (UI) of the mobile game, a time when a given UI element first appears at the UI, a time when a given interaction request appears at the UI, a time when a given phase of the mobile game is passed, and/or a time when a given field of the mobile game is completed.

Optionally, the at least one feature comprises at least one dynamic feature. Employing the software library enables the collecting of the feature data to be performed for the at least one dynamic feature of the given app. Examples of the at least one dynamic feature include, but are not limited to, sequences of different operations performed by the actual users of the given app. Collecting information about such dynamic features potentially enables a designer of the given app to alter parameters. As an example, the designer may make some operations in a newer version of the given app harder or easier than those present in an existing version of the given app.

Moreover, optionally, the collecting at the step (a) and/or the step (e) is performed by employing at least one sensory unit, included within or communicably coupled to the at least one user device, for monitoring live user reactions while the given app is running on the at least one user device.

Optionally, the at least one sensory unit has an input mechanism that is configured to monitor user's reactions while a user uses the given app. Examples of such input mechanisms include, but are not limited to, a touch-sensitive input, an audio input and a front-facing camera. As an example, a touch-sensitive screen included within a user device can be configured to monitor finger movements of a user. As another example, a microphone included within a user device can be configured to monitor audible sounds made by a user, such as heavy breathing, yelling and the like. As yet another example, a front-facing camera included within a user device can be configured to track eye movements of a user.

Optionally, the at least one sensory unit is implemented by way of at least one connected device, namely at least one other device communicably connected to the at least one user device. Optionally, the at least one connected device is employed to monitor user's immediate reactions while a user uses the given app. As an example, an Apple Watch connected to the at least one user device can be utilized to collect reactive data, such as heartbeat; "Apple" is a registered trademark.

Additionally, optionally, the collecting at the step (a) and/or the step (e) is performed, in part, by way of a manual input by a human operator. As an example, when the given app is a mobile game, a human operator plays the mobile game and provides answers to a set of predetermined questions.

Optionally, the feature data collected at the step (a) and/or the step (e) is stored at one or more databases.

Moreover, according to an embodiment of the present disclosure, the method further comprises retrieving other data related to the plurality of historical apps. Optionally, the other data includes at least one of: genre data, commercial sales data, marketing data, ranking data, user review, customer and consumer survey data.

Optionally, the other data is retrieved from one or more external information sources via information crawling. As an example, the external information sources include application distribution platforms, namely "App Stores", for example such as Apple App Store, Google Play, Windows Phone Store, and BlackBerry App World; "Apple", "Google", "Windows" and "BlackBerry" are registered trademarks. In this example, the ranking data corresponds to a top grossing ranking list provided by such application distribution platforms.

As another example, the other data can be retrieved by searching on the Internet, for example, for reviews, information about marketing investments, Internet-based advertisements and similar provided on social media and blogs. It will be appreciated that reviews, marketing investments, advertisements and similar information are indicative of a success of an app. As an example, if a mobile app, for example such as a mobile game, is well advertised and receives positive reviews, then it is highly likely that the mobile app is successful.

Optionally, the other data is stored at the one or more databases, or at one or more other databases.

In one example implementation, the aforementioned method is used for analysing at least one mobile game. It will be appreciated that games played on portable computing devices are simple to describe, as they are not dependent on a design of a hardware platform, but rather rely on a basic hardware setup, for example such as a display with a sufficient resolution, a touch-sensitive input, an audio output, a haptic output and an Internet connection.

Mobile games are typically distributed by application distribution platforms, namely "App Stores", maintained by, for example, Google, Apple, Microsoft and BlackBerry for their respective mobile operating system platforms; "Apple", "Google", "Windows" and "BlackBerry" are registered trademarks. The app stores also publish a top grossing ranking list and a list of most downloaded games, for example on a weekly basis. The published list provides at least one of: a number of downloads made for a given game, information about a game genre of the given game, a publisher of the given game, a name of the given game, a version of the given game, and/or an intended age group of the given game. It will be appreciated that the number of downloads corresponds to a popularity of the given game. The published list acts as a source of the other data.

Moreover, according to an embodiment of the present disclosure, the classifying at the step (c) and/or the step (g) is performed based upon mutually different genres to which the plurality of historical apps and/or the at least one test app belong. In other words, for a given app, classification of features of the given app is performed within a given genre to which the given app belongs. As an example, it would not be useful to try to predict a success of an action-based war game by comparing with reference data from puzzle games meant for children.

Optionally, in this regard, the mutually different genres to which the plurality of historical apps belong are determined from the genre data related to the plurality of historical apps.

Optionally, when classifying at the step (c) and/or the step (g), it is determined whether a given feature of a given app is meaningful or non-meaningful, for example within a given genre to which the given app belongs. Optionally, such determination is made for each feature of the given app. As an example, a feature is determined to be meaningful within a given genre if the feature is found in more than a predefined number of successful historical apps belonging to the given genre, namely historical apps that belong to the given genre and are successful. The predefined number is either user-defined or system-defined by default. As another example, for a given app, a feature is determined to be meaningful if it has a statistically significant link to a success of the given app. In this regard, for a given historical app, its success is determined from at least one of: the ranking data, the commercial sales data, the marketing data, and the user review data.

Optionally, features that are determined to be meaningful (hereinafter referred to as "meaningful features") are further classified into the plurality of feature groups, based upon a correlation between the features over a set of apps belonging to a given genre. Optionally, such classifying is performed by using k-means clustering, a self-organizing map or another similar clustering technique.

As an example, in a given genre, a first feature and a second feature are classified into a same feature group if a probability of an app having the first and second features exceeds a predefined threshold value. The predefined threshold value is either user-defined or system-defined by default. As another example, in a given genre, if the number of apps having a first feature and a second feature exceeds a predefined percentage of a total number of apps being analysed in the given genre, the first and second features are classified into the same feature group. The predefined percentage is either user-defined or system-defined by default.

A table below provides an example of a correlation performed between various features of a given app during classification.

|      | a(i)       | b(i)       | c(i)       | d(i)       | ... | n(i) |
|------|------------|------------|------------|------------|-----|------|
| a(i) | —          |            |            |            |     | —    |
| b(i) | f[b(i),a(i)] | —          |            |            |     | —    |
| c(i) | f[c(i),a(i)] | f[c(i),b(i)] | —          |            |     | —    |
| d(i) | f[d(i),a(i)] | f[d(i),b(i)] | f[d(i),c(i)] | —          |     | —    |
| ...  | ...        | ...        | ...        | ...        |     | —    |
| n(i) | f[n(i),a(i)] | f[n(i),b(i)] | f[n(i),c(i)] | f[n(i),d(i)] | ... | —    |

In the above table, elements 'a(i)', 'b(i)', 'c(i)', 'd(i)', ... 'n(i)' represents various features of a given app 'i' in a given genre. An element 'f[x(i),y(i)]' represents a correlation between a feature 'x(i)' and a feature 'y(i)' over a set of historical apps in the given genre, namely a likelihood of an app in the given genre having both the features 'x(i)' and 'y(i)'.

Optionally, the classifying at the step (c) and/or the step (g), namely the classification of the features into the meaningful and non-meaningful features and the classification of the meaningful features into the plurality of feature groups, is performed in an automated manner. It is to be noted here that the number of the features being classified is not limited to any specific number. The aforementioned method is suitable from a small number to a large number of features (for example, several hundreds).

It will be appreciated that the classification can alternatively be performed in a manner that features are first classified into the plurality of feature groups, and then further classified into meaningful and non-meaningful features, namely in a reverse order of processing steps to an order of processing steps employed above.

Moreover, according to an embodiment of the present disclosure, the method further comprises predefining the plurality of feature groups in a manner that the plurality of feature groups are understandable and interpretable by humans. An example of such understandable and interpretable feature groups will be provided later in conjunction with FIGS. 4A to 4C.

Moreover, according to an embodiment of the present disclosure, the assigning at the step (d) and/or the step (h) is performed in an automated manner.

Optionally, the assigning at the step (d) and/or the step (h) comprises defining a maximum weight and a minimum weight, namely an upper bound and a lower bound, for the weights to be assigned.

Optionally, the assigning at the step (d) and/or the step (h) comprises determining optimal weights for meaningful features of a given app. As an example, if a particular feature is not present in a given app, that particular feature is assigned a weight of '0' (zero) for the given app; however, if the particular feature is present in the given app, that particular feature is assigned a certain weight.

Moreover, according to an embodiment of the present disclosure, the method further comprises determining an overall score of a given app from weights that are assigned to features of the given app. Optionally, the overall score of the given app is calculated as a sum of the weights that are assigned to the features of the given app. Additionally, optionally, a score is calculated for each feature group as a sum of weights assigned to features classified into that feature group.

Optionally, in this regard, the weights are determined in a manner that the overall score of the given app correlates as high as possible with a commercial potential of the given app. As an example, when the given app is a historical app, the overall score of the historical app correlates with the ranking data of the historical app; when the given app is a test app, the overall score of the test app correlates with a future commercial potential of the test app.

Optionally, when the given app is a historical app, the assigning of the weights, namely the assigning at the step (d), and the determining of the overall score are performed in an iterative manner. Optionally, in this regard, iterations of the assigning of the weights and the determining of the overall score are performed based upon a comparison between the overall score of the historical app and the ranking data of the historical app.

Moreover, according to an embodiment of the present disclosure, the method further comprises scaling the weights assigned at the step (d) and/or the step (h) in a manner that an overall score of a given app, namely a sum of weights that are assigned to features of the given app, is less than or equal to a predefined maximum number. Optionally, the predefined maximum number is 100. It is to be noted here that the predefined maximum number is not limited to 100, and can be any number other than 100. However, it is potentially advantageous to define the predefined maximum number in a manner that is easy to understand and interpret. Optionally, in the method, the predefined maximum number is either user-defined or system-defined by default.

Optionally, the scaling of the weights is performed in an automated manner.

The scaling of the weights potentially enables scores of various apps to be determined in a manner that the scores are easy to understand, interpret and compare.

Moreover, according to an embodiment of the present disclosure, the method further comprises providing at least one developer associated with the at least one test app with an improvement proposal for the at least one test app. An example of such improvement proposal will be provided later in conjunction with FIGS. 4A to 4C.

Furthermore, according to an embodiment of the present disclosure, the steps (a) to (h) are performed on a periodic basis. As an example, the steps (a) to (h) can be repeated on a weekly basis. This enables the one or more databases to be updated with most recent feature data of the plurality of historical apps and possibly, with feature data of new historical apps. This also enables the analysis of the at least one test app to be performed again with respect to the most recent feature data.

It will be appreciated that as trends in making apps change with time, it is possible that an app that previously had a low success potential now has a high success potential. Therefore, it is potentially advantageous to re-analyse apps that were developed previously in order to make a recommendation of selecting at least one of the apps for publishing and marketing, for example, when a new success potential of the at least one of the apps is higher than a previous success potential of the at least one of the apps.

Optionally, in this regard, the method further comprises notifying at least one of a publisher, a developer, an investor about the at least one test app when an overall score of the at least one test app is greater than or equal to a predefined threshold score. The predefined threshold score is either user-defined or system-defined by default.

Embodiments of the present disclosure are susceptible to being used for various purposes, including, though not limited to, enabling developers to gain an insight into which features should be implemented in apps and how the apps should be modified so as to suit current trends in making apps, and enabling publishers and other relevant parties, such as developers, investors, and so forth, to select apps that are commercially viable.

For illustration purposes only, there will now be considered an example implementation of the aforementioned method pursuant to embodiments of the present disclosure.

An example operation loop includes the following steps:
Step 1: Reference data is generated.
Step 1 includes:
Step 1.1: Feature data and other data related to a plurality of historical apps are collected.
Step 1.2: Features of the plurality of historical apps are extracted from the feature data.
Step 1.3: The features are classified. In this step, the plurality of historical apps are classified into different genres. Analysis is then performed within each genre.
Step 1.4: Weights are assigned to the features of the plurality of historical apps.
Step 1.5 (optional): The weights are scaled.
Step 1.6: For each historical app, an overall score of that historical app is calculated from weights assigned to features of that historical app. Additionally, optionally, a score is calculated for each feature group as a sum of weights assigned to features classified into that feature group. A weight may have predefined upper and lower limit.
Step 1.7: The overall score is compared with ranking data included in the other data. For a given historical app, if the overall score of the given historical app does not correlate with the ranking data of the given historical app, the step 1.4 is repeated. Iterations of the steps 1.4 to 1.7 are performed till the overall score begins to correlate with the ranking data. For a given set of historical apps, if the overall score of the given set of historical apps does not correlate with the ranking data of the given set of historical apps, the step 1.4 is repeated. Iterations of the steps 1.4 to 1.7 are performed till the overall scores begins to correlate with the ranking data.
Step 2: At least one test app is compared with the plurality of historical apps.
The step 2 includes:
Step 2.1: Feature data related to the at least one test app is collected.
Step 2.2: Features of the at least one test app are extracted from the feature data.
Step 2.3: The features are classified.
Step 2.4: Weights are assigned to the features of the at least one test app.
Step 2.5 (optional): The weights are scaled.
Step 2.6: For each test app, an overall score of that test app is calculated from weights assigned to features of that test app. Additionally, optionally, a score is calculated for each feature group as a sum of weights assigned to features classified into that feature group.
Step 2.7: A report is compiled from the overall score and/or scores calculated for each feature group. The report is then sent to an interested party. As an example, the report can be sent to at least one developer of the at least one test app. As another example, a notification can be sent to at least one publisher when the overall score of the at least one test app is greater than or equal to a predefined threshold score.

Optionally, in the report, scores that are below a predefined minimum value are indicated, for example, by highlighting in red. More optionally, scores that are above a predefined maximum value are indicated, for example, by highlighting in green, while scores that fall between the predefined minimum value and the predefined maximum value are indicated, for example, by highlighting in yellow. This potentially acts as an improvement proposal for the at least one developer of the at least one test app. The report so compiled provides an easy to understand, meaningful and practical guidance related to the at least one test app.

Optionally, the step 1 is repeated from time to time, in order to update the reference data. Optionally, in this regard, the step 1 is repeated on a periodic basis.

Moreover, optionally, the step 2 is repeated from time to time, in order to re-analyse apps that were developed previously. Optionally, in this regard, the step 2 is repeated on a periodic basis.

In a second aspect, embodiments of the present disclosure provide a system for analyzing at least one test app, the system comprising a data processing arrangement, wherein the data processing arrangement is operable to:
(a) collect feature data related to a plurality of historical apps;
(b) extract features of the plurality of historical apps from the feature data collected at (a);
(c) classify the features of the plurality of historical apps into a plurality of feature groups;
(d) assign weights to the features of the plurality of historical apps to generate reference data;
(e) collect feature data related to the at least one test app;
(f) extract features of the at least one test app from the feature data collected at (e);
(g) classify the features of the at least one test app into the plurality of feature groups; and
(h) assign weights to the features of the at least one test app based upon the reference data generated at (d).

Optionally, the plurality of historical apps include apps that have been successful within their respective genres during a predefined time period. The predefined time period is either user-defined or system-defined by default. As an example, the predefined time period can be last one week, last two weeks, last one month, last two months, last quarter, last year, and so on.

According to an embodiment of the present disclosure, the data processing arrangement is operable to collect the feature data at (a) and/or (e) in an automated manner. Optionally, when collecting the feature data at (a) and/or (e), the data processing arrangement is operable to receive the feature data corresponding to at least one feature of a given app from at least one user device on which the given app has run or is running.

Optionally, when collecting the feature data at (a) and/or (e), the data processing arrangement is operable to employ a software library that is linked with the given app. Optionally, the software library is linked with the given app during a development phase of the given app. Optionally, in this regard, a developer links the software library with the given app according to a predefined manual. Alternatively, optionally, the software library is linked with the given app using a plug-in architecture.

As a result, the given app makes a function call to the software library when the at least one feature of the given app is invoked. Optionally, a function to which the given app makes the function call then writes information related to the at least one feature, namely the feature data corresponding to the at least one feature, onto a log maintained at the at least one user device.

The log is then sent to the data processing arrangement. Optionally, the log is sent on a periodic basis. Alternatively, optionally, the log is sent in near real time, namely while the given app is running on the at least one user device. This potentially enables the feature data to be collected in near real time from actual users of the given app.

Optionally, the at least one feature comprises at least one dynamic feature. Employing the software library enables the feature data to be collected for the at least one dynamic feature of the given app. Examples of the at least one dynamic feature include, but are not limited to, sequences of different operations performed by the actual users of the given app. Collecting information about such dynamic features potentially enables a designer of the given app to alter parameters. As an example, the designer may make some operations in a newer version of the given app harder or easier than those present in an existing version of the given app.

Moreover, optionally, when collecting the feature data at (a) and/or (e), the data processing arrangement is operable to employ at least one sensory unit, included within or communicably coupled to the at least one user device, for monitoring live user reactions while the given app is running on the at least one user device.

Optionally, the at least one sensory unit has an input mechanism that is configured to monitor user's reactions while a user uses the given app. Examples of such input mechanisms include, but are not limited to, a touch-sensitive input, an audio input and a front-facing camera. As an example, a touch-sensitive screen included within a user device can be configured to monitor finger movements of a user. As another example, a microphone included within a user device can be configured to monitor audible sounds made by a user, such as heavy breathing, yelling and the like. As yet another example, a front-facing camera included within a user device can be configured to track eye movements of a user.

Optionally, the at least one sensory unit is implemented by way of at least one connected device, namely at least one other device communicably connected to the at least one user device. Optionally, the at least one connected device is employed to monitor user's immediate reactions while a user uses the given app. As an example, an Apple Watch connected to the at least one user device can be utilized to collect reactive data, such as heartbeat; "Apple" is a registered trademark.

Additionally, optionally, the data processing arrangement is operable to collect the feature data at (a) and/or (e), in part, by way of a manual input by a human operator. As an example, when the given app is a mobile game, a human operator plays the mobile game and provides the data processing arrangement with answers to a set of predetermined questions.

Optionally, the data processing arrangement is operable to store the feature data collected at (a) and/or (e) at one or more databases associated with the data processing arrangement.

Moreover, according to an embodiment of the present disclosure, the data processing arrangement is operable to retrieve other data related to the plurality of historical apps. Optionally, the other data includes at least one of: genre data, commercial sales data, marketing data, ranking data, user review data.

Optionally, the data processing arrangement is operable to retrieve the other data from one or more external information sources via information crawling. As an example, the external information sources include application distribution platforms, namely "App Stores", for example such as Apple App Store, Google Play, Windows Phone Store, and BlackBerry App World; "Apple", "Google", "Windows" and "BlackBerry" are registered trademarks. In this example, the ranking data corresponds to a top grossing ranking list provided by such application distribution platforms.

Optionally, the data processing arrangement is operable to retrieve the other data by searching on the Internet, for example, for reviews, information about marketing investments, Internet-based advertisements and similar provided on social media and blogs. It will be appreciated that reviews, marketing investments, advertisements and similar information are indicative of a success of an app. As an example, if a mobile app, for example such as a mobile game, is well advertised and receives positive reviews, then it is highly likely that the mobile app is successful.

Optionally, the data processing arrangement is operable to store the other data at the one or more databases, or at one or more other databases.

Moreover, according to an embodiment of the present disclosure, the data processing arrangement is operable to classify the features at (c) and/or (g) based upon mutually different genres to which the plurality of historical apps and/or the at least one test app belong.

Optionally, the data processing arrangement is operable to classify the features at (c) and/or (g) in an automated manner.

Moreover, according to an embodiment of the present disclosure, the data processing arrangement is operable to predefine the plurality of feature groups in a manner that the plurality of feature groups are understandable and interpretable by humans.

Moreover, according to an embodiment of the present disclosure, the data processing arrangement is operable to assign the weights at (d) and/or (h) in an automated manner.

Optionally, when assigning at (d) and/or (h), the data processing arrangement is operable to define a maximum weight and a minimum weight, namely an upper bound and a lower bound, for the weights to be assigned.

Optionally, when assigning at (d) and/or (h), the data processing arrangement is operable to determine optimal weights for meaningful features of a given app.

Moreover, according to an embodiment of the present disclosure, the data processing arrangement is operable to determine an overall score of a given app from weights that are assigned to features of the given app. Optionally, the data processing arrangement is operable to calculate the overall score of the given app as a sum of the weights that are assigned to the features of the given app. Additionally, optionally, a score is calculated for each feature group as a sum of weights assigned to features classified into that feature group.

Optionally, in this regard, the data processing arrangement is operable to determine the weights in a manner that the overall score of the given app correlates as high as possible with a commercial potential of the given app. As an example, when the given app is a historical app, the overall score of the historical app correlates with the ranking data of the historical app; when the given app is a test app, the overall score of the test app correlates with a future commercial potential of the test app.

Optionally, when the given app is a historical app, the data processing arrangement is operable to assign the weights at (d) and determine the overall score in an iterative manner.

According to an embodiment of the present disclosure, the data processing arrangement is operable to assign the weights at (d) and determine the overall score, based upon a comparison between the overall score of the historical app and the ranking data of the historical app.

Moreover, according to an embodiment of the present disclosure, the data processing arrangement is operable to scale the weights assigned at (d) and/or (h) in a manner that an overall score of a given app, namely a sum of weights that are assigned to features of the given app, is less than or equal to a predefined maximum number. Optionally, the predefined maximum number is 100. It is to be noted here that the predefined maximum number is not limited to 100, and can be any number other than 100. However, it is potentially advantageous to define the predefined maximum number in a manner that is easy to understand and interpret. Optionally, the predefined maximum number is either user-defined or system-defined by default.

Optionally, the data processing arrangement is operable to scale the weights in an automated manner.

The scaling of the weights potentially enables scores of various apps to be determined in a manner that the scores are easy to understand, interpret and compare.

Moreover, according to an embodiment of the present disclosure, the data processing arrangement is operable to provide at least one developer associated with the at least one test app with an improvement proposal for the at least one test app. An example of such improvement proposal will be provided later in conjunction with FIGS. 4A to 4C.

Furthermore, according to an embodiment of the present disclosure, the data processing arrangement is operable to perform (a) to (h) on a periodic basis. This enables the one or more databases to be updated with most recent feature data of the plurality of historical apps and possibly, with feature data of new historical apps. This also enables the analysis of the at least one test app to be performed again with respect to the most recent feature data.

It will be appreciated that as trends in making apps change with time, it is possible that an app that previously had a low success potential now has a high success potential. Therefore, it is potentially advantageous to re-analyse apps that were developed previously in order to make a recommendation of selecting at least one of the apps for publishing and marketing, for example, when a new success potential of the at least one of the apps is higher than a previous success potential of the at least one of the apps.

Optionally, in this regard, the data processing arrangement is operable to notify at least one publisher about the at least one test app when an overall score of the at least one test app is greater than or equal to a predefined threshold score. The predefined threshold score is either user-defined or system-defined by default.

Furthermore, an example system pursuant to embodiments of the present disclosure has been illustrated in conjunction with FIG. 2 as explained in more detail below. The system includes a feature extractor, a data retriever, a feature classifier and a weight assigner. Optionally, the system also includes a score scaler, a report compiler and a system manager.

Optionally, the feature extractor, the data retriever, the feature classifier, the weight assigner, the score scaler, the report compiler and the system manager are mutually different software modules that communicate with each other and operate independently. Optionally, at least some of these different software modules are executed on different computing hardware, for example, different processors.

When executed, the feature extractor, the data retriever, the feature classifier, the weight assigner, the score scaler, the report compiler and the system manager together form a data processing arrangement of the system.

When executed, the feature extractor is operable to collect feature data related to a plurality of historical apps, and to extract features of the plurality of historical apps from the feature data, as described earlier.

The feature extractor is then operable to store the feature data and/or the extracted features at one or more databases.

When executed, the data retriever is operable to retrieve other data related to the plurality of historical apps, as described earlier.

The data retriever is then operable to store the other data at the one or more databases, or at one or more other databases.

Optionally, for a given app, the feature data, the extracted features and the other data are linked through a unique identification (ID) of the given app. Optionally, the unique ID is assigned to the given app based upon at least one of: a name of the given app, a given version of the given app, a release date of the given version, and/or a publisher of the given app.

It will be appreciated that there can be multiple datasets of the feature data, the extracted features and the other data for a given app. These multiple datasets typically arise from different sets of features provided in different versions of the given app and/or from varying success rates of the given app at different times. Therefore, the feature extractor and the data retriever update their respective databases, for example, on a periodic basis.

When executed, the feature classifier is operable to classify the features of the plurality of historical apps into a plurality of feature groups, as described earlier.

When executed, the weight assigner is operable to assign weights to the features of the plurality of historical apps to generate reference data, as described earlier.

Furthermore, when executed, the feature extractor is operable to collect feature data related to at least one test app, and to extract features of the at least one test app from the feature data, as described earlier.

When executed, the feature classifier is operable to classify the features of the at least one test app into the plurality of feature groups, as described earlier.

When executed, the weight assigner is operable to assign weights to the features of the at least one test app, as described earlier.

When executed, the score scaler is operable to determine an overall score of a given app from weights that are assigned to features of the given app, and to scale the weights, as described earlier.

When executed, the report compiler is operable to compile a report for at least one interested party.

Optionally, the report is in a machine-readable form, and is sent automatically to an app development system, for example, for a purpose of an automated and iterative development cycle of the at least one test app.

Alternatively, optionally, the report is in a human-readable form. As an example, the report is in a form of an improvement proposal for the at least one test app, and is sent to at least one developer associated with the at least one test app. As another example, the report is in a form of an alert, which is sent to at least one publisher for notifying the at least one publisher about a success potential of the at least one test app.

When executed, the system manager is operable to control the functionality of at least some of various modules of the system, namely at least some of the feature extractor, the data retriever, the feature classifier, the weight assigner, the score scaler and the report compiler.

Optionally, in this regard, the system manager is operable to perform at least one of:

(i) set various operative parameters, for example, such as a frequency of data retrieval, a predefined maximum number to be used during scaling of weights, a predefined threshold score for determining a success potential of a given app, and so forth;
(ii) provide a user interface (UI) for a human operator to set at least one of the various operative parameters;
(iii) assign unique IDs to apps; and/or
(iv) remove duplicate entries in the databases.

It will be appreciated that each of the aforementioned modules has its own role in the system, and is adaptable to performance requirements of the system. In other words, a selection of methods employed in each of the modules is based on an overall performance of the system. As an example, the feature classifier can employ either a statistical method or a machine learning method. If replacing a current method with a new method improves the performance of the system, then the new method is employed in the feature classifier.

Optionally, in this regard, the performance of the system is measured based upon at least one of:
(i) a predictive power of the system, namely how well the system predicts a success potential of a given app, and/or
(ii) a computational speed of the system, namely how fast the system operates and calculates an overall score of the given app.

Moreover, optionally, the operation of the system is automatized as each of the different modules operates in an automated manner.

For illustration purposes only, there will now be considered an example environment, wherein the aforementioned system is implemented pursuant to embodiments of the present disclosure. One such example environment has been illustrated in conjunction with FIG. 1 as explained in more detail below.

The example environment includes the aforementioned system, one or more databases associated with the system, one or more external information sources, and a client system.

Optionally, at least one of the one or more databases is used to store feature data and other data related to a plurality of historical apps. Additionally, optionally, at least one the one or more databases is used to store analyses performed by the system.

The system is communicably coupled to the one or more databases, for example, via a communication network or via a direct connection.

The system is communicably coupled to the one or more external information sources and the client system, for example, via the communication network or another communication network that is isolated from the communication network.

The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

According to an embodiment of the present disclosure, the client system is an app development system with which the system is integrated for a purpose of an automated and iterative development cycle of at least one test app. Optionally, in this regard, the system is operable to communicate results of the analyses to the client system directly.

In a third aspect, embodiments of the present disclosure provide a computer program product comprising a non-transitory machine-readable data storage medium having stored thereon program instructions that, when accessed by a processing device, cause the processing device to:

(a) collect feature data related to a plurality of historical apps;
(b) extract features of the plurality of historical apps from the feature data collected at (a);
(c) classify the features of the plurality of historical apps into a plurality of feature groups;
(d) assign weights to the features of the plurality of historical apps to generate reference data;
(e) collect feature data related to the at least one test app;
(f) extract features of the at least one test app from the feature data collected at (e);
(g) classify the features of the at least one test app into the plurality of feature groups; and
(h) assign weights to the features of the at least one test app based upon the reference data generated at (d).

DETAILED DESCRIPTION OF DRAWINGS

Referring now to the drawings, particularly by their reference numbers, FIG. 1 is an illustration of an example network environment 100 in which a system 102 for analysing at least one test app is implemented pursuant to embodiments of the present disclosure.

The network environment 100 includes the system 102, one or more databases associated with the system 102, depicted as databases 104 and 106 in FIG. 1, one or more external information sources, depicted as external information sources 108 and 110, and a client system 112.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of databases, external information sources and client systems. A person skilled in the art will recognize many variations, alternatives, and modifications of embodiments of the present disclosure.

Figure 2:
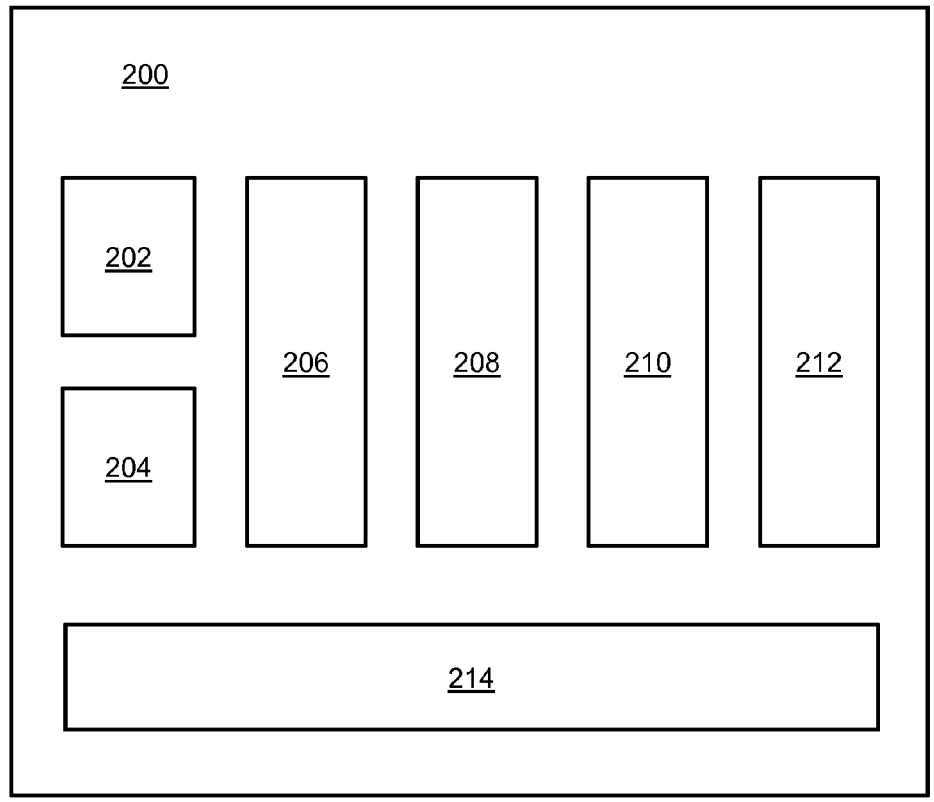
FIG. 2 is a schematic illustration of a system for analysing at least one test app, in accordance with an embodiment of the present disclosure.

FIG. 2 is a schematic illustration of a system 200 for analysing at least one test app, in accordance with an embodiment of the present disclosure.

The system 200 includes a feature extractor 202, a data retriever 204, a feature classifier 206 and a weight assigner 208. Optionally, the system 200 also includes a score scaler 210, a report compiler 212 and a system manager 214.

When executed, the feature extractor 202, the data retriever 204, the feature classifier 206, the weight assigner 208, the score scaler 210, the report compiler 212 and the system manager 214 together form a data processing arrangement of the system 200.

FIG. 2 is merely an example, which should not unduly limit the scope of the claims herein. It is to be understood that the specific designation for the system 200 is provided as an example and is not to be construed as limiting the system 200 to specific numbers, types, or arrangements of modules and/or components of the system 200. A person skilled in the art will recognize many variations, alternatives, and modifications of embodiments of the present disclosure.

Figure 3A:
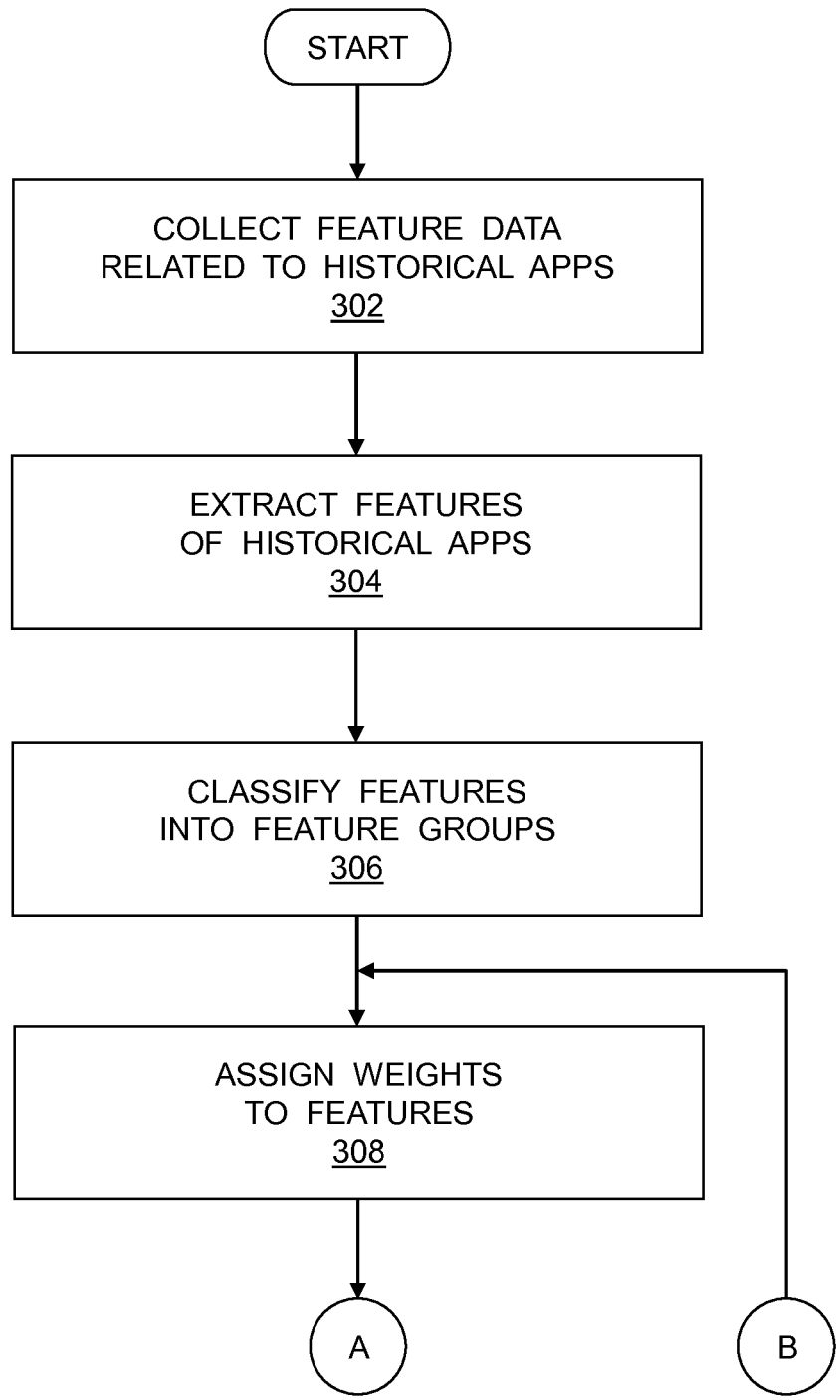
FIGS. 3A, 3B and 3C collectively are an illustration of steps of a method for analysing at least one test app, in accordance with an embodiment of the present disclosure.
Figure 3B:
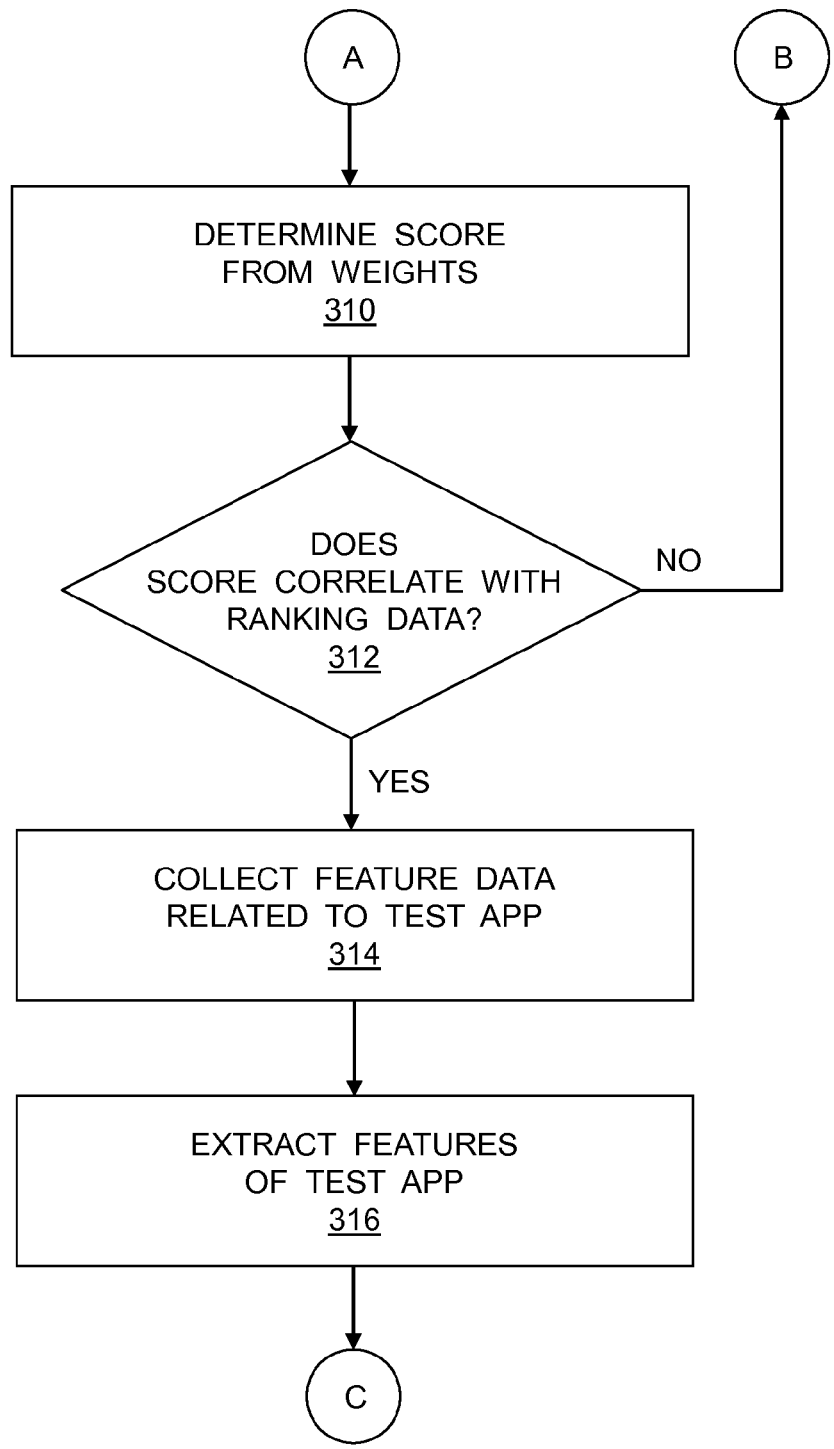
Figure 3C:
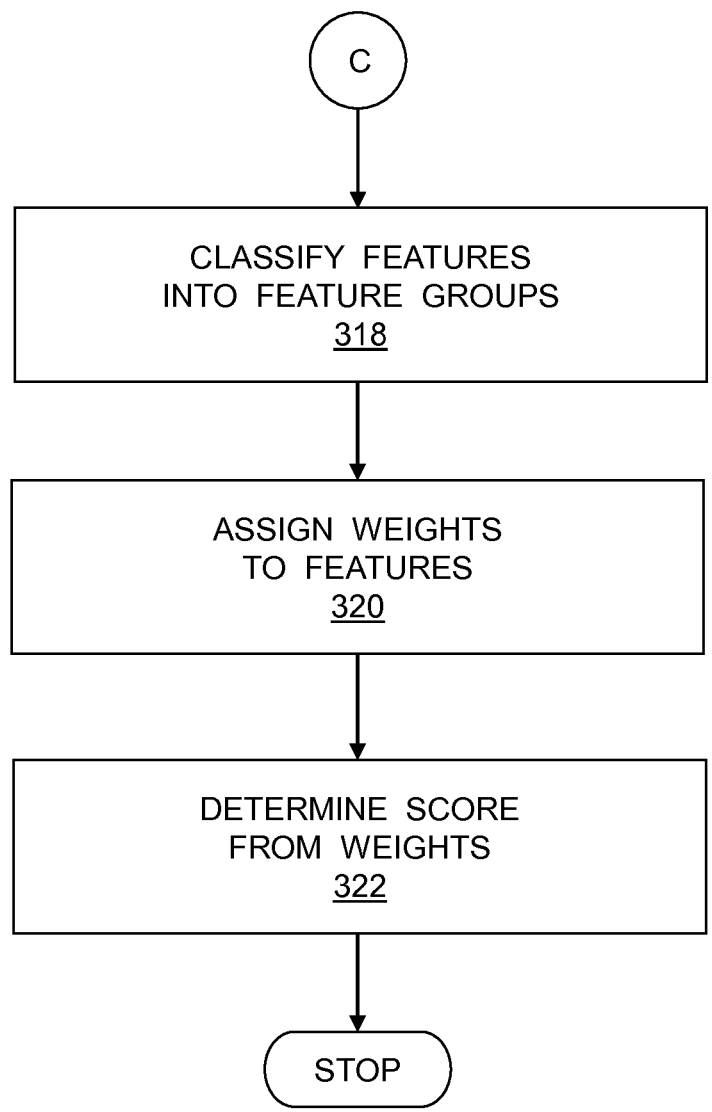

FIGS. 3A, 3B and 3C collectively are an illustration of steps of a method for analysing at least one test app, in accordance with an embodiment of the present disclosure. The method is depicted as a collection of steps in a logical flow diagram, which represents a sequence of steps that can be implemented in hardware, software, or a combination thereof.

At a step 302, feature data related to a plurality of historical apps is collected.

At a step 304, features of the plurality of historical apps are extracted from the feature data collected at the step 302.

Next, at a step 306, the features of the plurality of historical apps are classified into a plurality of feature groups.

Subsequently, at a step 308, weights are assigned to the features of the plurality of historical apps.

At a step 310, for each app, an overall score of that app is determined from weights that are assigned to features of that app.

At a step 312, it is determined whether or not an overall score of a given app correlates with ranking data of the given app. If it is found that the overall score of the given app does not correlate with the ranking data of the given app, the step 308 is repeated. Otherwise, if it is found that the overall score of the given app correlates with the ranking data of the given app, a step 314 is performed.

As a result of the steps 302 to 312, reference data is generated.

Next, at the step 314, feature data related to the at least one test app is collected.

At a step 316, features of the at least one test app are extracted from the feature data collected at the step 314.

At a step 318, the features of the at least one test app are classified into the plurality of feature groups.

At a step 320, weights are assigned to the features of the at least one test app based upon the reference data generated at the steps 302 to 312.

At a step 322, for each test app, an overall score of that test app is determined from weights that are assigned to features of that test app.

The steps 302 to 322 are only illustrative and other alternatives can also be provided where one or more steps are added, one or more steps are removed, or one or more steps are provided in a different sequence without departing from the scope of the claims herein.

Figure 4A:
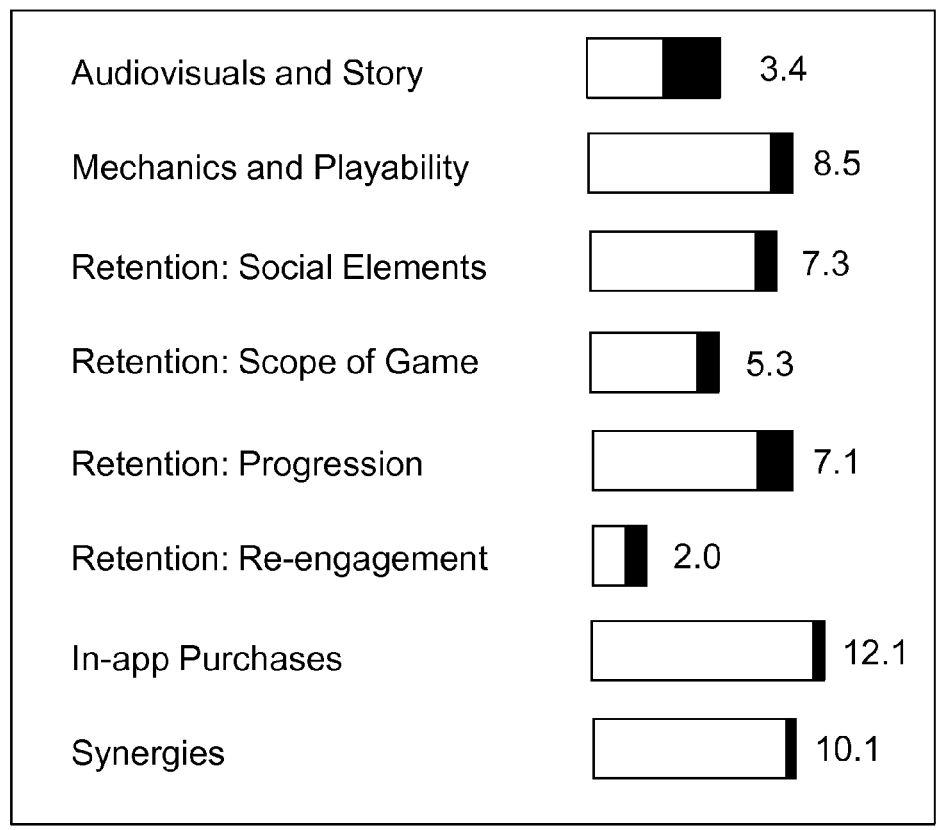
FIGS. 4A, 4B and 4C are schematic illustrations of an example report compiled for an example test app, in accordance with an embodiment of the present disclosure.
Figure 4B:
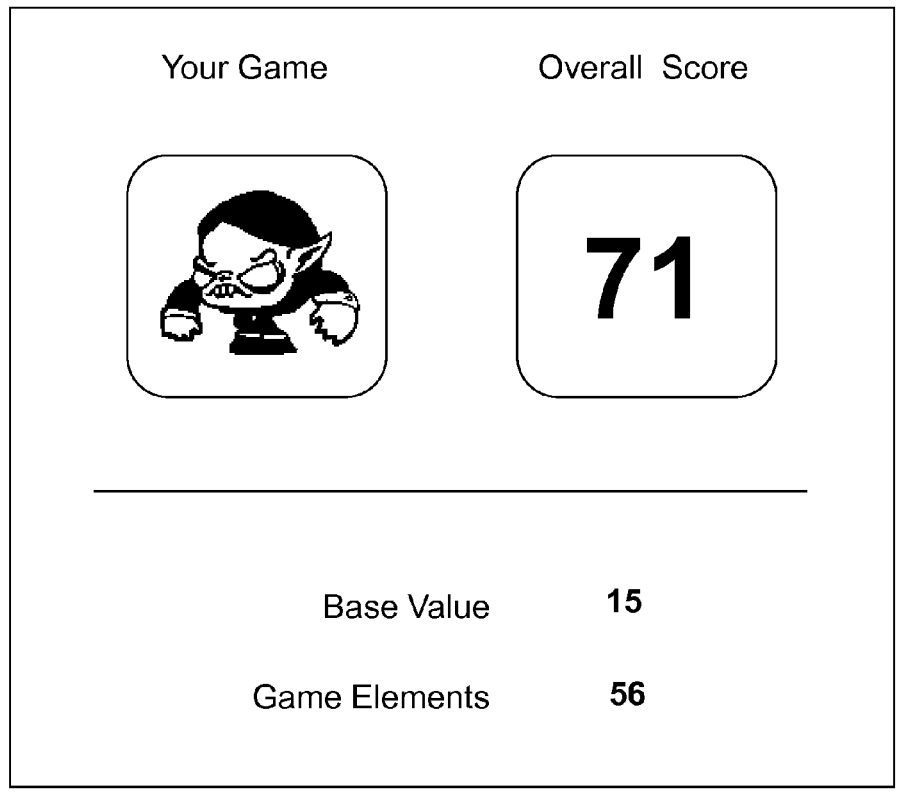
Figure 4C:
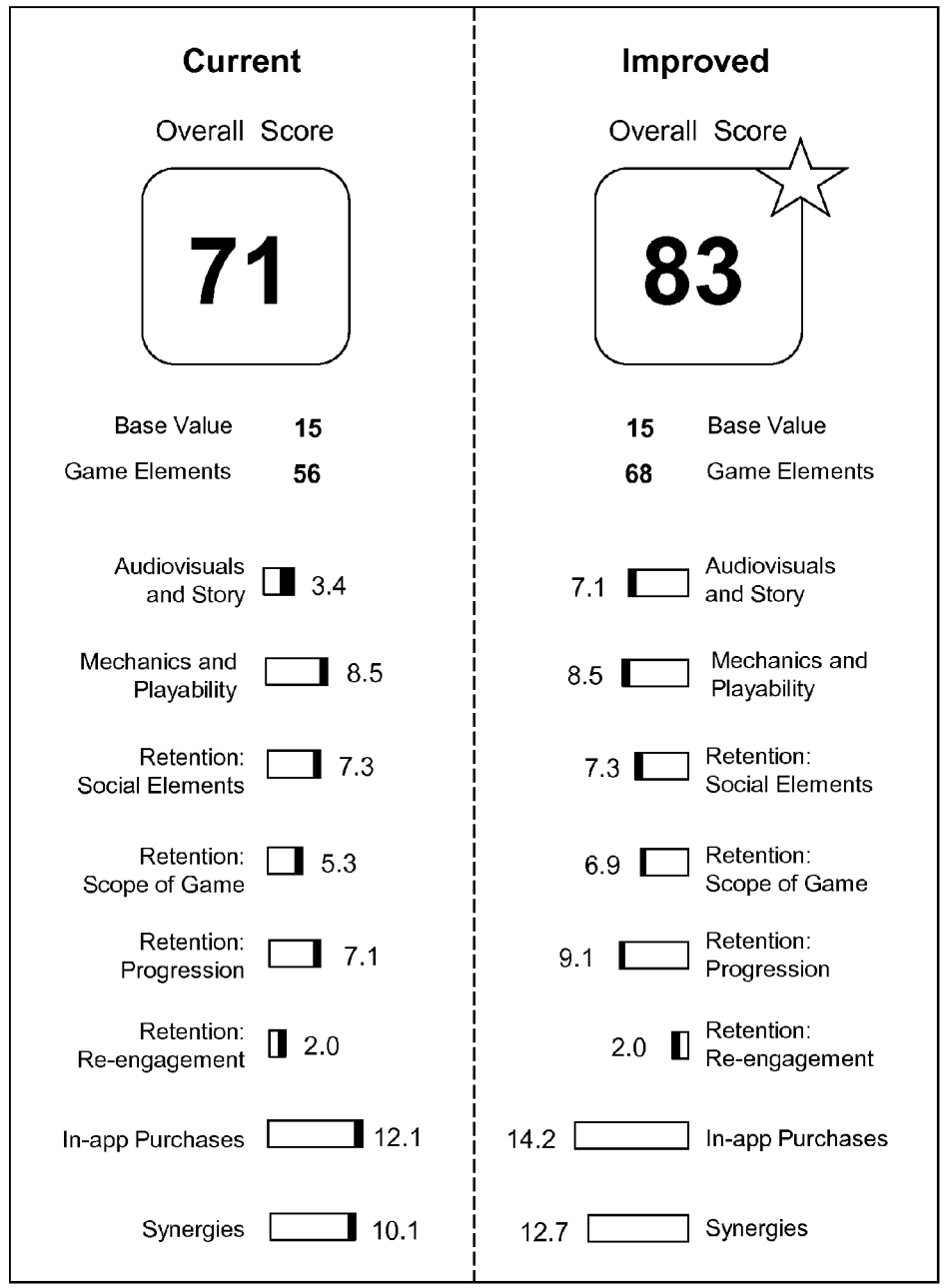

FIGS. 4A, 4B and 4C are schematic illustrations of an example report compiled for an example test app, in accordance with an embodiment of the present disclosure. With reference to FIGS. 4A to 4C, the example test app is a mobile game.

With reference to FIG. 4A, features of the mobile game are classified into following feature groups:
(i) elements related to audio-visuals and story of the game,
(ii) elements related to game mechanics and playability,
(iii) elements related to social aspects of the game,
(iv) elements related to a scope of the game,
(v) elements related to progression of the game,
(vi) elements related to re-engagement,
(vii) elements related to in-app purchases, and
(viii) elements related to synergies.

It will be appreciated that these feature groups are predefined in a manner that they are easy to understand and interpret by humans.

In FIG. 4A, there are shown scores associated with the aforementioned feature groups. Optionally, such scores are determined from a sum of weights assigned to features classified into each feature group.

In FIG. 4B, there is shown an overall score of the mobile game. The overall score is calculated as a sum of the scores associated with the aforementioned feature groups and a base value assigned to the mobile game.

In FIG. 4C, there is shown a comparison between a current version and an improved version of the mobile game. Such a comparison is potentially advantageous, for example, when running an iterative development cycle.

FIGS. 4A to 4C are merely examples, which should not unduly limit the scope of the claims herein. A person skilled in the art will recognize many variations, alternatives, and modifications of embodiments of the present disclosure.

The present disclosure is applicable also to other application categories, such as business apps, music apps, travel apps, and other categories commonly present in app stores. Furthermore the present disclosure is applicable to a wider range of consumer devices, such as game consoles.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method executed by one or more processors for analyzing at least one test app, the method comprising:
(a) running a plurality of historical apps on one or more first user devices;
(b) collecting feature data related to the plurality of historical apps;
(c) extracting features of the plurality of historical apps from the feature data collected at the step (b);
(d) classifying the features of the plurality of historical apps into a plurality of feature groups;
(e) assigning weights to the features of the plurality of historical apps to generate reference data;
(f) running the at least one test app on one or more second user devices;
(g) collecting feature data related to the at least one test app;
(h) extracting features of the at least one test app from the feature data collected at the step (g);
(i) classifying the features of the at least one test app into the plurality of feature groups;
(j) assigning weights to the features of the at least one test app based upon the reference data generated at the step (e);
(k) calculating a score of a given app from weights that are assigned to features of the given app, wherein when the given app is a historical app, the assigning of the weights at the step (e) and the calculating of the score are performed in an iterative manner, and wherein iterations of the assigning of the weights at the step (e) and the calculating of the score are performed based on a comparison between the score of the historical app and ranking data of the historical app; and
(l) providing an improvement proposal for the given app based on the score of the given app to at least one developer.

2. The method according to claim 1, wherein the collecting at the step (b) and/or the step (g) is performed in an automated manner.

3. The method according to claim 1, wherein the collecting at the step (b) and/or the step (g) is performed by employing a software library that is linked with the given app, and wherein the given app makes a function call to the software library when at least one feature of the given app is invoked.

4. The method according to claim 1, wherein at least one feature of the given app comprises at least one dynamic feature of the given app.

5. The method according to claim 1, wherein the collecting at the step (b) and/or the step (g) is performed by employing at least one sensory unit, included within or communicably coupled to at least one user device, for monitoring live user reactions while the given app is running on the at least one user device.

6. The method according to claim 1, wherein the method further comprises predefining the plurality of feature groups in a manner that the plurality of feature groups are understandable and interpretable by humans.

7. The method according to claim 1, wherein the classifying at the step (d) and/or the step (i) is performed based upon mutually different genres to which the plurality of historical apps and/or the at least one test app belong.

8. The method according to claim 1, wherein the method further comprises scaling the weights assigned at the step (e) and/or the step (j) in a manner that a sum of weights that are assigned to features of a given app is less than or equal to a predefined maximum number.

9. The method according to claim 1, wherein the steps (a) to (l) are performed on a periodic basis.

10. The method according to claim 1, wherein the method further comprises notifying at least one publisher about the at least one test app when a score of the at least one test app is greater than or equal to a predefined threshold score.

11. A system comprising one or more processors for analyzing at least one test app, wherein the system comprises a data processing arrangement of software modules executing on the one or more processors, and wherein the system is operable to:
  (a) collect feature data related to a plurality of historical apps running on one or more first user devices;
  (b) extract features of the plurality of historical apps from the feature data collected at the step (a);
  (c) classify the features of the plurality of historical apps into a plurality of feature groups;
  (d) assign weights to the features of the plurality of historical apps to generate reference data;
  (e) collect feature data related to the at least one test app running on one or more second user devices;
  (f) extract features of the at least one test app from the feature data collected at the step (e);
  (g) classify the features of the at least one test app into the plurality of feature groups;
  (h) assign weights to the features of the at least one test app based upon the reference data generated at the step (d);
  (i) calculate a score of a given app from weights that are assigned to features of the given app, wherein when the given app is a historical app, assign the weights at the step (d) and calculate the score in an iterative manner;
  (j) assign the weights at the step (d) and calculate the score based on a comparison between the score of the historical app and ranking data of the historical app; and
  (k) provide an improvement proposal for the given app based on the score of the given app to at least one developer.

12. The system according to claim 11, wherein the system is further operable to collect the feature data at the step (a) and/or the step (e) in an automated manner.

13. The system according to claim 11, wherein when collecting the feature data at the step (a) and/or the step (e), the system is further operable to employ a software library that is linked with the given app, and wherein the given app makes a function call to the software library when at least one feature of the given app is invoked.

14. The system according to claim 11, wherein at least one feature of the given app comprises at least one dynamic feature of the given app.

15. The system according to claim 11, wherein when collecting the feature data at the step (a) and/or the step (e), the system is further operable to employ at least one sensory unit, included within or communicably coupled to at least one user device, for monitoring live user reactions while the given app is running on the at least one user device.

16. The system according to claim 11, wherein the system is further operable to predefine the plurality of feature groups in a manner that the plurality of feature groups are understandable and interpretable by humans.

17. The system according to claim 11, wherein the system is further operable to classify the features at the step (c) and/or the step (g) based upon mutually different genres to which the plurality of historical apps and/or the at least one test app belong.

18. The system according to claim 11, wherein the system is further operable to scale the weights assigned at the step (d) and/or the step (h) in a manner that a sum of weights that are assigned to features of a given app is less than or equal to a predefined maximum number.

19. The system according to claim 11, wherein the system is further operable to perform the steps (a) to (k) on a periodic basis.

20. The system according to claim 11, wherein the system is further operable to notify at least one publisher about the at least one test app when a score of the at least one test app is greater than or equal to a predefined threshold score.

21. A computer program product comprising a non-transitory machine-readable data storage medium having stored thereon program instructions that, when accessed by a processing device, cause the processing device to:
  (a) collect feature data related to a plurality of historical apps running on one or more first user devices;
  (b) extract features of the plurality of historical apps from the feature data collected at the step (a);
  (c) classify the features of the plurality of historical apps into a plurality of feature groups;
  (d) assign weights to the features of the plurality of historical apps to generate reference data;
  (e) collect feature data related to the at least one test app running on one or more second user devices;
  (f) extract features of the at least one test app from the feature data collected at the step (e);
  (g) classify the features of the at least one test app into the plurality of feature groups;
  (h) assign weights to the features of the at least one test app based upon the reference data generated at the step (d);
  (i) calculate a score of a given app from weights that are assigned to features of the given app, wherein when the given app is a historical app, assign the weights at the step (d) and calculate the score in an iterative manner;
  (j) assign the weights at the step (d) and calculate the score based on a comparison between the score of the historical app and ranking data of the historical app; and
  (k) provide an improvement proposal for the given app based on the score of the given app to at least one developer.

* * * * *